(No Model.) 2 Sheets—Sheet 2.
R. B. AYRES.
UNDERGROUND ELECTRIC TROLLEY SYSTEM.
No. 485,252. Patented Nov. 1, 1892.
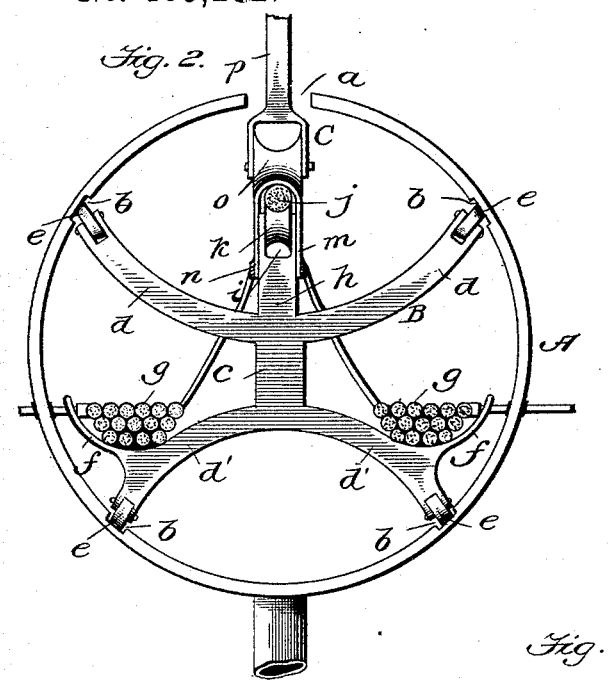
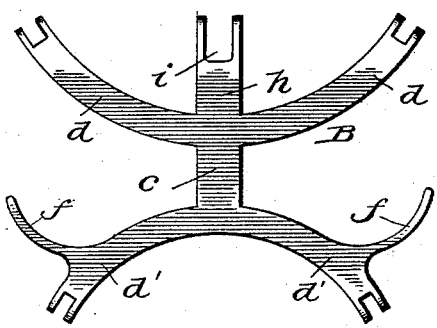
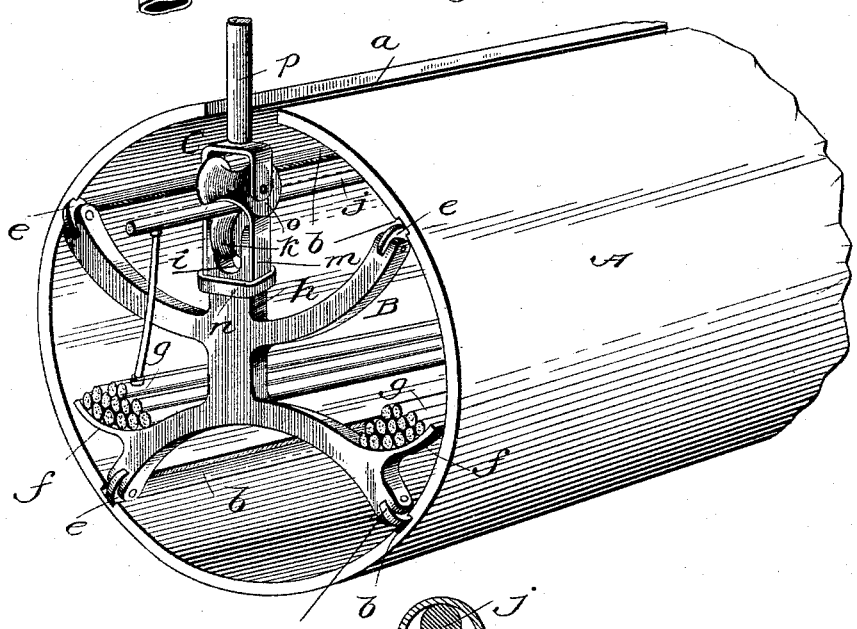
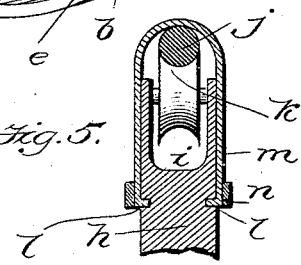
Witnesses:
E. Everett Ellis
Curtis Lammond
Inventor:
Ruben B. Ayres.
By Amer W. Intire
Attorney.

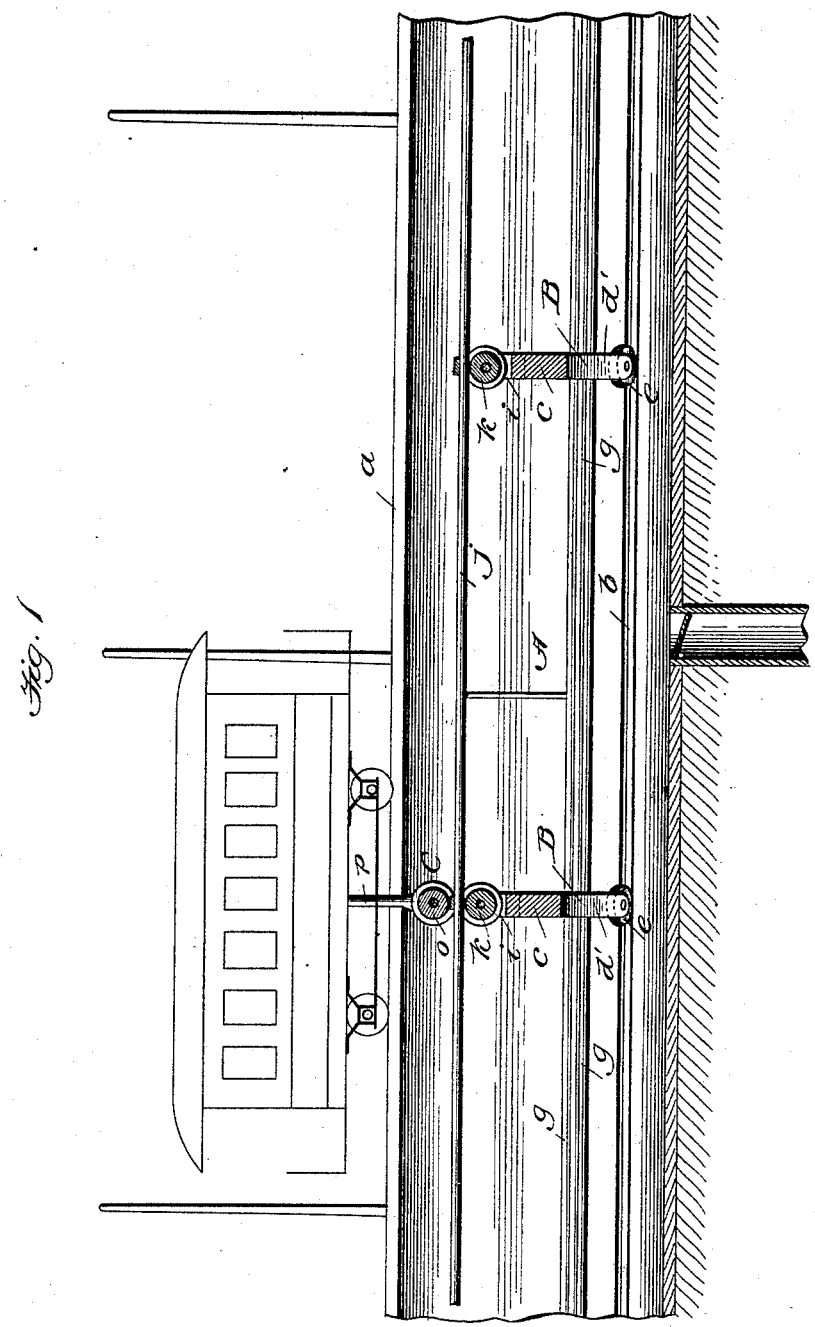

UNITED STATES PATENT OFFICE.

RUBEN B. AYRES, OF NEW YORK, N. Y.

UNDERGROUND ELECTRIC TROLLEY SYSTEM.

SPECIFICATION forming part of Letters Patent No. 485,252, dated November 1, 1892.

Application filed March 23, 1892. Serial No. 426,112. (No model.)

*To all whom it may concern:*

Be it known that I, RUBEN B. AYRES, a citizen of the United States, residing at New York city, in the county of New York and State of New York, have invented certain new and useful Improvements in Underground Electric Trolley Systems; and I do hereby declare the following to be a full, clear, and exact description of the invention, such as will enable others skilled in the art to which it appertains to make and use the same.

This invention relates to certain new and useful improvements in underground electric trolley systems; and it consists, substantially, in such novel features thereof as will hereinafter be more particularly described and claimed.

This object of the invention is to provide an underground electric trolley system for electrically operating at stated or predetermined intervals all kinds of signals arranged in a continuous line or direction, as well as all kinds of tripping and alarm mechanisms, also so arranged, and wherein an alarm, signal, or piece of mechanism or apparatus is to be operated at certain distances apart or at given times with respect to each other.

The invention also has for its object to provide means for supplying electric motors of an electric underground trolley system with a constant source or quantity of electric energy, so as to propel the apparatus in which such motor may be placed.

A further object of the invention is to provide simple and effective mechanism which shall be under easy control and management and one which can be readily laid and repaired, substantially as will hereinafter more particularly appear when taken in connection with the accompanying drawings, wherein—

Figure 1 represents a longitudinal sectional elevation of an underground electric trolley system embodying the features of my improvement, the said figure indicating the use of the system in connection with railroad-signals which are arranged at regular intervals alongside the railroad-track in any of the usual or well-known manners. Fig. 2 is an end elevation, enlarged, showing the major part of the interior devices of the conduit in elevation. Fig. 3 is a perspective view of a portion of the system, and Fig. 4 is an enlarged front elevation of the stationary frame which holds and supports the trolley-wire. Fig. 5 is an enlarged sectional detail representing the manner of securing the trolley-wire tightly in place on its supports after the said wire has been passed through and tightened or drawn up by any suitable means for that purpose.

In carrying my invention into effect—for instance, when employed for use in connection with a system of railroad signaling or alarm mechanism—I employ a conduit of iron or other suitable material and preferably of round or circular contour. The sections of the conduit may be united or secured together by any preferred form of coupling or joint, and the said sections are each provided with an opening or slot extending the entire length of the same, so that when the sections are united a continuous longitudinal opening will be created throughout the entire length of the system. The said conduit is laid underground, so that the continuous opening will be about flush with the surface of the earth, and preferably, though not essentially, the location thereof is between or centrally of the rails of the track. A trolley-arm passes up through the said opening and by being made to connect electrically with the alarm or signaling mechanism will be operated, as will appear more fully hereinafter.

The interior surface of the pipe or conduit of the system is formed or provided at corresponding sides or points with longitudinal track-grooves, which receive and permit of ready placing of the stationary frames which are located within said pipe or conduit and support the trolley-wire. These grooves may be arranged in any position best suited to the purpose; but instead of using grooves I may employ rails, so long as the parts of the stationary frames operating in connection therewith are correspondingly shaped and of insulating material.

The frame for supporting the trolley-wire within the pipe or conduit is constructed of a central body having four or more members extending out therefrom laterally and provided with rollers of insulating material, which fit into and travel the grooves of the said pipe or conduit when said frame is inserted from one end of the conduit and moved up or along to the place it is intended to occupy in use. The said frame is also formed with an upward central extension, which is constructed to receive the trolley-wire, and it is upon the said trolley-wire that the wheel of the trolley hereinbefore mentioned is made to travel in the practice of the invention. The said stationary frame is, furthermore, formed or provided with suitable shelves or brackets, which hold or support extra feed-wires, which are run out from the dynamo or other electric-power apparatus arranged at either end of the line or system. These feed-wires are employed for carrying an extra current to supply the trolley-wire at given points. At certain intervals of the line of pipe or conduit suitable drain-pipes are employed, which lead to a sewer for carrying off water and other accumulations.

Reference being had to the several parts by the letters marked thereon, A represents the conduit or line of pipe employed in the system, the said conduit being constructed or composed of a number of sections of iron pipe or other conducting material, the said sections being formed or provided with longitudinal slots or openings $a$, coinciding with each other, so as to create a continuous opening, and being arranged flush or even with the ground surface, as shown in Fig. 1. These sections are joined or interlocked at the adjacent ends in any preferred well-known manner, and they are formed on their inner sides or surfaces with grooves $b\ b\ b\ b$ in parallelism and coinciding with each other in a continuous line or direction. Instead of these grooves I may employ tracks; but for the purpose of my invention I prefer the grooves, on account of being less trouble to make, in addition to other reasons.

Located or arranged within the line of pipe or conduit A at suitable distances apart are a number of frames B, the same being constructed of a main or central portion or body $c$ and a number of arms or members $d\ d$ and $d'\ d'$, branching outwardly therefrom and reaching to the grooves $b$, hereinbefore mentioned. Each of the said arms carries at its end a roller $e$, of porcelain or other insulating material, which fits into the grooves, as shown, and in this way the said frames are slipped into their proper places within the conduit, it being simply necessary to insert them from one end and then move them along in any suitable way, the rollers being caused to travel the grooves while this is being done. Besides this the said frame is also maintained in its proper relative position and cannot be turned either accidentally or otherwise until the rollers are removed from the grooves. The said frame B is also formed or provided with the shelves or brackets $ff$ for receiving and holding feed-wires $g$, which are run out from the dynamo or other electric-power apparatus located at either end of the line, said wires being for the purpose of supplying extra electric current to the trolley-wire at given points by means of any suitable electric connection between the two. It is apparent that should it not be the wish to employ these extra feed-wires the shelves or brackets $ff$ could be dispensed with from the frame B. The frame B is, furthermore, formed or constructed with a central upwardly-extending portion or branch $h$, that is cut out as shown at $i$, so as to better receive and support the trolley-wire $j$, and in order to facilitate the easy and ready drawing of said wire through said frames or supports a roller $k$ is mounted in said cut-out portion, as shown. Each side of the supporting member or branch $h$ is formed or provided with an opening or hole $l$ to receive the ends of a curved or bent spring $m$, that is pressed or slipped down upon the trolley-wire in such manner that the ends of said springs will be received into the openings, and thus will the said wire be tightly held in place after it has been passed through its supports and properly drawn up or tightened. A ring $n$ is slipped down over the spring in the manner shown, so as to prevent the ends of said spring from coming out of place.

C represents the trolley, having the usual wheel or pulley $o$ for moving upon or against the trolley-wire, and the arm $h$ of said trolley is preferably inclosed or surrounded by a non-conducting covering, such as fabric or rubber.

From the foregoing it will be observed that various changes could be resorted to in the general details of construction and arrangement of the several parts employed, and therefore it will be understood that I do not wish to limit myself precisely to the details shown.

Having thus described my invention, what I claim as new, and desire to secure by Letters Patent, is—

1. In an underground electric trolley system, a supporting-frame for the trolley-wire, having an upward extension in which a roller is held or mounted, a spring fitting said extension so as to admit a trolley-wire, and a ring embracing said spring, substantially as shown and described.

2. In an underground electric trolley system, the combination of the trolley-wire, a supporting-frame therefor having an upward extension, a roller held by said extension, a spring fitting down over the wire, the ends of which are received into the sides of the extension, and a ring passing down over the spring, substantially as shown, and for the purpose set forth.

3. In an underground electric trolley system employing a conduit slotted longitudinally throughout its length, the frame B, constructed of the main body, having lateral limbs or branches reaching out and bearing against the inner sides of the conduit, one or more of such branches being formed or provided with brackets for the support of wires or conductors independently of the trolley-wire, substantially as shown, and for the purpose described.

In testimony whereof I affix my signature in presence of two witnesses.

RUBEN B. AYRES.

Witnesses:
  JOS. DERHEIMER,
  K. J. BAUER.